US008164814B2

(12) United States Patent
Nerden

(10) Patent No.: US 8,164,814 B2
(45) Date of Patent: Apr. 24, 2012

(54) DOMESTIC VIEWING PANEL UNIT

(75) Inventor: John D Nerden, Chigwell (GB)

(73) Assignee: Vistamatic Limited, Hainault, Essex (GB)

( * ) Notice: Subject to any disclaimer, the term of this patent is extended or adjusted under 35 U.S.C. 154(b) by 338 days.

(21) Appl. No.: 12/523,665

(22) PCT Filed: Jan. 23, 2007

(86) PCT No.: PCT/GB2007/000215

§ 371 (c)(1),
(2), (4) Date: Nov. 24, 2009

(87) PCT Pub. No.: WO2008/090298

PCT Pub. Date: Jul. 31, 2008

(65) Prior Publication Data

US 2010/0110519 A1 May 6, 2010

(51) Int. Cl.
*G02B 26/02* (2006.01)

(52) U.S. Cl. .................................................... 359/233

(58) Field of Classification Search .................. 359/223, 359/504

See application file for complete search history.

(56) References Cited

U.S. PATENT DOCUMENTS

| | | | | |
|---|---|---|---|---|
| 2,250,059 | A | 7/1941 | Farney | |
| 4,579,426 | A | 4/1986 | Onufry | |
| 4,869,021 | A * | 9/1989 | Gregory | 359/894 |
| 6,182,402 | B1 * | 2/2001 | Aalst | 52/106 |

FOREIGN PATENT DOCUMENTS

| | | | |
|---|---|---|---|
| GB | 1296594 | A | 11/1972 |
| GB | 2152566 | A | 8/1985 |

* cited by examiner

*Primary Examiner* — Euncha Cherry

(74) *Attorney, Agent, or Firm* — Harness, Dickey & Pierce, P.L.C.

(57) ABSTRACT

A domestic viewing panel unit for a door, comprising: a first panel comprising one or more first panel light transparent regions that are substantially transparent to visible light and one or more first panel light hindering regions which substantially hinder transmission of visible light; a second panel comprising one or more second panel light transparent regions that are substantially transparent to visible light and one or more second panel light hindering regions which substantially hinder transmission of visible light; an actuator for moving the second panel relative to the first panel in a plane parallel to the plane of the first panel; wherein the first and second panels are arranged such that the amount of visible light transmitted unhindered through the domestic viewing panel is a non-linear function of the relative position of the first and second panels.

14 Claims, 7 Drawing Sheets

DOMESTIC VIEWING PANEL UNIT

CROSS-REFERENCE TO RELATED APPLICATION

This application is a National Phase Entry of International Application No. PCT/GB2007/000215, filed on Jan. 23, 2007, and published in English as WO 2008/090298 A1, which is entirely incorporated by reference herein.

The present invention relates to domestic viewing panels, in particular viewing panels for use in front doors.

Peepholes for the main entrance doors of houses are known and typically consist of a round opening at face level filled with a transparent medium such as glass. The glass may be shaped into a lens so as to afford a more suitable viewing angle for a user looking outwards, and the size of the hole and/or arrangement of the lens may be chosen so that it is difficult for a person on the outside of the door to determine whether or not they are being observed via the peephole. The small size of the peephole and intrinsically limited performance of any lens that may be present means that the view to the outside is frequently of low quality, making it difficult to establish the identity of a visitor to the house and virtually impossible to verify identification documents or cards that the visitor may be willing to offer.

It is also known to provide a main entrance door with a light-transmitting portion made from glass or a similar medium with light-transmitting properties. One reason such an arrangement is desirable is because it allows a certain amount of light through the door, which improves the environment within the house. However, for security reasons, it is desirable that such windows do not allow a person standing outside the door to see inside the house, and the light-transmitting portions are often either located in a portion of the door above eye level or arranged so as to scatter light rays passing through them, by means of "frosting" or the like. While such light-transmitting portions may allow an outline of a visitor to the house to be distinguished, it is difficult to identify a visitor positively and, like the peephole, virtually impossible to verify identification papers.

It is an object of the present invention to provide an arrangement which at least partially overcomes the above-mentioned problems with the prior art.

According to an aspect of the invention, there is provided a domestic viewing panel unit for a door, comprising: a first panel comprising one or more first panel light transparent regions that are substantially transparent to visible light and one or more first panel light hindering regions which substantially hinder transmission of visible light; a second panel comprising one or more second panel light transparent regions that are substantially transparent to visible light and one or more second panel light hindering regions which substantially hinder transmission of visible light; an actuator for moving said second panel relative to said first panel in a plane parallel to the plane of said first panel; wherein said first and second panels are arranged such that the amount of visible light transmitted unhindered through the domestic viewing panel unit is a non-linear function of the position of the second panel relative to the position of the first panel, for at least a portion of an allowed range of actuation.

Establishing such a non-linear relationship provides a convenient and cost-effective way of improving the ease of actuation of the viewing panel unit without having to resort to complex actuation mechanisms. For example, actuation can be made to suit the context within which the viewing panel unit is to be used, in particular to facilitate particular common opening sequences by providing appropriately variable sensitivity. Particular opening sequences could, for example, be characterized by a plot of the proportion of light transmitted unhindered against time, and the patterns on the first and second panels could be adjusted so that the proportion of light transmitted unhindered would vary in a similar way in time for a comfortable constant rate of actuation of the viewing panel unit. Effectively, the sensitivity of the viewing panel unit can be adjusted so as to be high when rapid opening or closing is required and low when slower opening or closing is required.

By "substantially" hindered what is meant is hindered to such an extent that a typical user would not be able to see clearly through the region in question. Substantial hindering may occur by absorption of a majority of incident light, for example, so that there is insufficient light to allow an image to be seen. Additionally or alternatively, substantial hindering may occur by scattering, such as occurs in frosted glass, for example. Additionally or alternatively, surface roughening may also be used. Additionally or alternatively, the hindering regions may be formed from glass having varying thickness, small-scale undulations for example, which distorts any viewed image due to refraction effects. Alternatively or additionally, the hindering regions may be given reflective coatings or be made from a reflective material such as a metal. Examples of materials that scatter light include frosted glass, while examples of materials that distort a viewed image include glass patterned for bathroom windows (which may also be frosted). It should be understood that any combination of the above methods might be used to provide the hindering regions.

By "substantially" transparent what is meant is transparent to such an extent that a typical user can see clearly through the region in question.

Actuation of the panel unit may involve moving the second panel from a "closed" position in which there is no light path through the viewing unit from the outside which does not involve passing through either or both of the "hindering" regions of the first and second panels (i.e. the first panel light hindering regions and the second panel light hindering regions) to an "open" position in which there is at least partial overlap between the transparent regions of the first and second panels so as to provide regions through which light can penetrate from the outside to the inside without passing though hindering regions. Actuation may be achieved by twisting a knob or by directly sliding the second panel using a rigidly connected handle, for example, and the amount that the second panel has moved relative to the first panel in response to actuation may be referred to as the degree of actuation. Typically, there will be a linear relationship between the actuating movement (e.g. the angle through which the knob has been rotated or the distance of sliding of the handle) and the degree of actuation; in other words, the amount of movement of the second panel will be directly proportional to amount of movement of the actuator.

The panels may be arranged such that the amount of visible light transmitted unhindered through the domestic viewing panel is proportional to the degree of overlap of said second panel light transparent regions and said first panel light transparent regions.

This can be achieved by arranging for the second panel light transparent regions and the first panel light transparent regions to have a constant homogeneous transmittance (e.g. so that they are substantially uniformly transparent). As an alternative, either or both of the second panel light transparent regions and first panel light transparent regions may be provided with a spatially varying transmittance. This may be achieved by providing a partial or "dilute" frosting pattern on either or both of the second panel light transparent regions and first panel light transparent regions, for example. Such an arrangement might be used to obtain more complex variations in the way in which the amount of light transmitted by the viewing panel varies with the degree of actuation.

As mentioned above, there may be circumstances in which an operator of the viewing panel does not wish to open the viewing panel at a constant rate. As a particular example, where the viewing panel is fitted into an exterior door, the operator may wish to open the viewing panel only gradually at first (i.e. at a low average rate) to see whether a person outside looks threatening and then, depending on the results of the initial appraisal, to open the panel more quickly (i.e. at a higher rate) in order rapidly to improve the viewing quality so that identification papers can be examined or perhaps in order to provide a visual greeting before opening the door. Alternatively, it may be desirable to achieve the converse, namely a fast initial rate (e.g. in order rapidly to achieve enough light penetration to see through the door to some extent) following by a slower more cautious rate of opening (e.g. in order to improve the view just enough to recognise the person outside and/or his identification papers without presenting a risk that he sees into the house to any great extent). Without adaptation it may be inconvenient for a user to operate the basic actuator in the required way, particularly for extreme phases of the motion, e.g. extremely slow or extremely quick; that is it say, the sensitivity of the actuator is likely to be too low when he wishes to move the second panel quickly and too high when he wishes to move it very slowly. It is difficult and costly to design an actuation mechanism that is easy to use for a wide range of speeds.

The first and second panels may be arranged such that the first and second derivatives of the amount of visible light transmitted unhindered with respect to a displacement between said first and second panels are positive, for at least a portion of an allowed range of actuation. That is to say, when the transmittance itself increases with displacement, the rate that the transmittance changes with displacement also increases.

According to this embodiment, a user can apply a convenient roughly constant actuation movement to the actuator while achieving a rate of change of unhindered light transmittance that increases with time. This could be useful, for example, as discussed above, for phases of motion in which a user wishes to open the viewing panel at an increasing rate.

The first and second panels may be arranged such that the first derivative of the amount of visible light transmitted unhindered with respect to a displacement between said first and second panels is positive and a second derivative of the amount of visible light transmitted unhindered with respect to a displacement between said first and second panels is negative, for at least a portion of an allowed range of actuation. That is to say, when the transmittance itself increases with displacement, the rate that the transmittance changes with displacement in the same sense decreases.

According to this embodiment, a user can apply a convenient constant actuation movement to the actuator while achieving a rate of change of unhindered light transmittance that decreases with time. This could be useful, for example, as discussed above, for phases of motion in which a user wishes to open the viewing panel at a decreasing rate.

Combinations of the above two alternatives may be provided for different phases of the opening movement, for example a constant rate of actuation may provide an increasing rate of unhindered transmittance during a first phase and a decreasing rate of unhindered transmittance in a later phase.

The first and second panels may be arranged such that, from a starting position, actuation of said actuator in a first sense causes movement of said second panel relative to said first panel in a first direction such that the amount of visible light transmitted unhindered has a positive first derivative and a positive second derivative with respect to displacement in said first direction; and from the same starting position, actuation of said actuator in a second sense causes movement of said second panel relative to said first panel in a second direction such that the amount of visible light transmitted unhindered has a positive first derivative and a negative second derivative with respect to displacement in said second direction. The "starting position" may be a closed position for example.

For example, in a case where the actuator is actuated by rotating an actuator knob, actuation of the actuator in a first sense may correspond to clockwise rotation of the knob, and actuation of the actuator in a second sense may correspond to anticlockwise rotation of the knob. Where the second panel is actuated by sliding, more than, two directions of actuation may be possible (e.g. left and right as well as up and down in the plane of the panel). Having a light transmittance behaviour that changes according to the direction of actuation provides a user with greater control and flexibility; he can choose which of at least two different opening strategies to choose according to factors relevant to the particular application in question. Typical factors in the context of a viewing panel installed in a front door may be the time of day and/or whether the visitor can be heard through the door, for example.

The domestic viewing panel may be arranged such that the first panel light transparent regions are complementary with the second panel light hindering regions.

In this way, it is possible to define a fully closed position of the viewing panel unit in which the second panel is positioned such that the first panel light transparent regions are aligned with the corresponding (complementary) second panel light hindering regions in such a way that light incident on the viewing panel unit will always encounter a region that is partially or completely opaque to visible light (i.e. which hinders light transmission). The complementary nature of the regions means that in the fully closed position there will never be any substantial overlap between the first panel light hindering regions and the second panel light hindering regions, which could lead to some regions being more light hindering than others. For example, where the light hindering regions each block or interfere with 90% of incident light, overlapping light hindering regions would tend to block about 99% of light. Thus, this embodiment makes it possible to achieve a more homogeneous optical performance in the closed state.

The viewing panel unit may be arranged such that the way in which visible light is hindered varies as a function of position in the first or second panel light hindering regions, or both. This provides some flexibility in defining how light transmission varies as a function of position of the second panel. The way in which visible light is hindered may vary in the sense that the extent to which light is hindered varies (e.g. extent of absorption and/or scattering). Additionally or alternatively, the way in which visible light is hindered may vary in the sense that the nature of a distortion of the light rays varies (e.g. the angles of refraction and/or nature of interference effects may vary).

The viewing panel unit may comprise a third panel, arranged such that the second panel is located between the first and third panels.

A sealing arrangement may be provided so that a substantially sealed unit is formed around the second panel. This arrangement is particularly useful where it is desirable to protect the second panel from moisture, dust or other environmental conditions and/or human interference. It may also be appropriate where the vision panel unit is to be used in a location where security is required from both sides of whatever the unit is mounted into. The provision of a sealed unit is also advantageous because it makes it easier to install the viewing panel unit without compromising the security and/or weather resistance etc. of the element into which it is installed (e.g. exterior door).

The light hindering regions described above can be formed in the third panel instead of the first panel or in both the first and third panels. This provides greater flexibility in manufacture and also allows more complex optical effects to be achieved due to overlap between different layers. More combinations are possible when overlap can occur between three different patterns instead of two.

The actuator may comprise a rotatably mounted shaft and a cam attached to a distal end of the shaft and arranged to interact with the second panel so as to transform rotational movement of the shaft into linear movement of the second panel, wherein the cam is arranged such that there is a non-linear relationship between the angular displacement of the shaft and the relative displacement of the first and second panels. This arrangement may facilitate obtaining a desired non-linear light transmittance response.

Embodiments of the invention will now be described, by way of example only, with reference to the accompanying schematic drawings in which corresponding reference symbols indicate corresponding parts, and in which.

Figure 1:
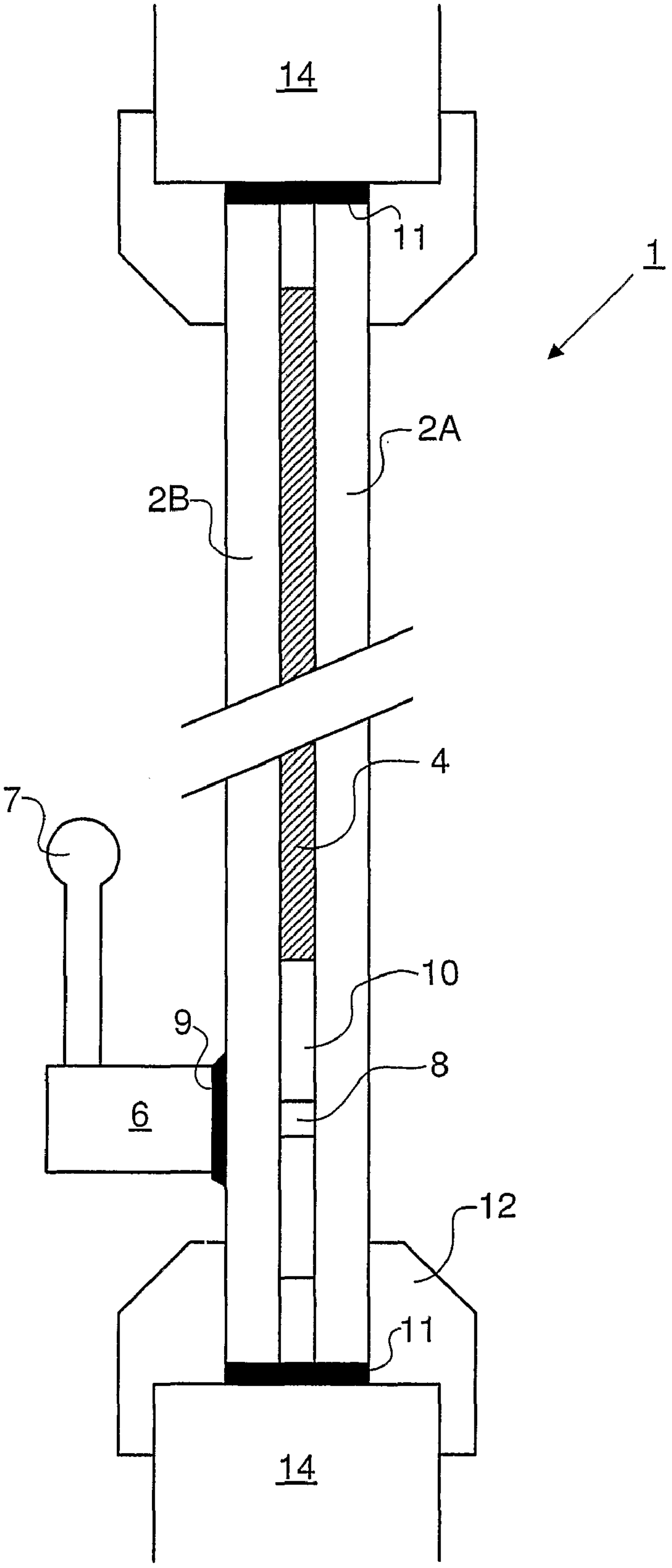
FIG. 1 is a sectional view of a viewing panel unit according to an embodiment of the invention, fitted into a frame.

FIG. 1 depicts in section a domestic viewing panel unit 1 fitted within a frame 14. The frame 14 may form part of an entrance door, for example, with the panel unit 1 serving as an actuatable peephole. The panel unit 1 shown comprises first and third panels 2A and 2B, one or both of which may be formed from glass (or other suitable transparent material) that has been reinforced to provide security. The thickness and/or strength of the reinforced glass may be chosen according to the context and expected requirements. Safety glass of 6-7 mm thickness may be used for the first and third panels 2A and 2B, for example. A second panel 4 is provided between the first and third panels 2A and 2B and is movable relative thereto (for example, up and down and/or side to side, into and out of the page). The second panel 4 may be formed from annealed glass, for example, of a thickness of about 4 mm.

In the example shown, it is envisaged that the second panel 4 should be moveable vertically relative to the first and third panels 2A/B and the frame 14 which is rigidly connected to the first and third panels 2A/B. An actuator 6 is provided to allow a user to control the movement of the second panel 4. In the example shown, the actuator 6 comprises a handle 7 which facilitates rotation of the actuator 6. The actuator 6 comprises a shaft portion 8, which penetrates through the third panel 2B into the region between the first and third panels 2A/B and beneath the second panel 4. The distal end of the shaft portion 8 (the end between the first and third panels 2A/B) cooperates with a cam 10 (i.e. connects thereto in such a way that rotation of the shaft 8 causes rotation of the cam 10). The cam 10 is shaped so as to transform rotational motion of the shaft 8 into linear motion (up and down in the example shown) of the second panel 4. A band may be provided in a lower portion of either or both of the first and third panels 2A/B so that the motion of the cam 10 is not visible from outside the panel unit 1.

The panel unit 1 may form a "sealed unit" by means of end members 11 and seal 9. One or more spacer bars (not shown) may be included to space the second panel 4 apart slightly from the first and/or third panels 2A/B.

Figure 2:
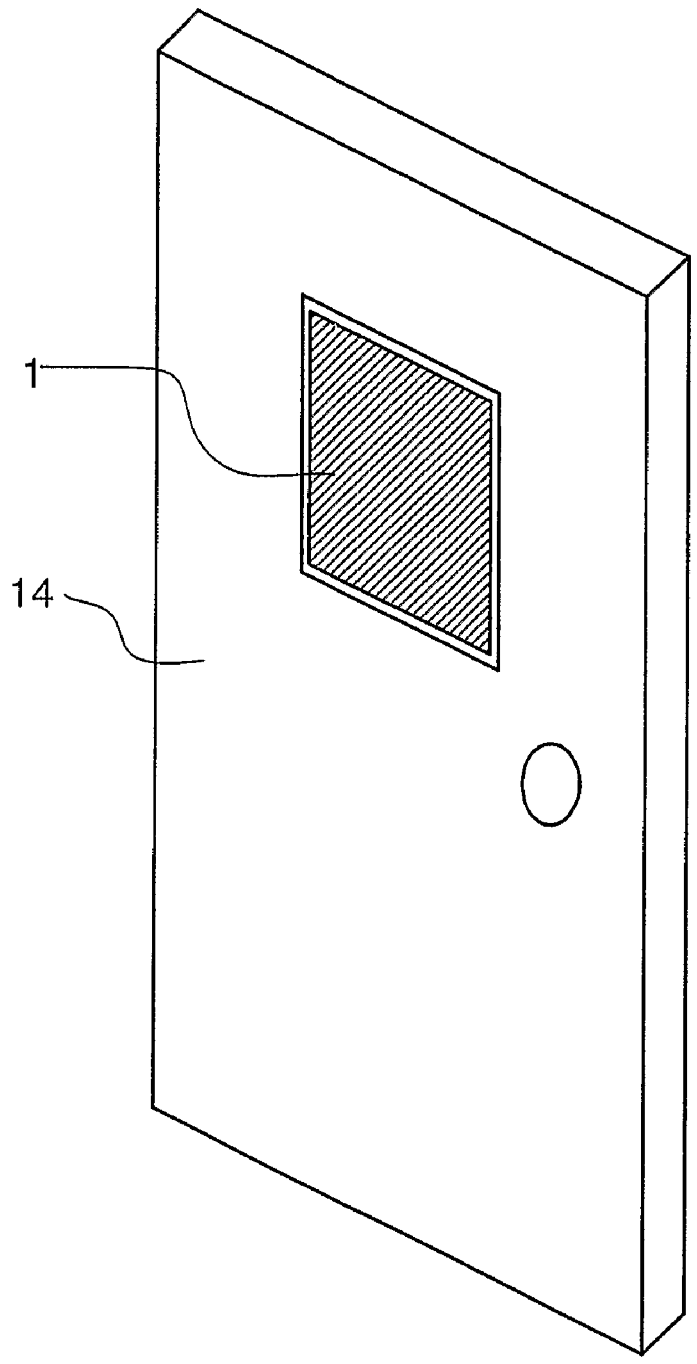
FIG. 2 depicts an entrance door fitted with a domestic viewing panel unit.

FIG. 2 depicts the panel unit 1 installed in an entrance door 14.

In order to vary the amount of light which is transmitted unhindered through the panel unit 1, the second panel 4 and one or both of the first and third panels 2A/B are provided with patterns on their surface or within the material of the panels. The patterns consist of regions which are basically transparent (like plain glass) and regions that hinder the passage of light through them, for example by reflecting, scattering and/or bending (refracting) a significant proportion of the incident light. The hindering regions are such that it would be difficult or impossible for a typical user to see a clear image through them. Similar hindering materials can be found in glass panes for bathrooms or toilets, for example, which comprise regions of uneven thickness (which causes image distortion by refraction) and/or frosting (which causes image distortion or clouding by scattering).

The degree to which a user is able to see properly through the panel unit 1 will depend on the extent to which transparent regions on the first and third panels 2A/B line up (or overlap) with transparent regions on the second panel 4. This is controlled by the degree of actuation of the actuator 6 (i.e. the distance that the second panel 4 has been moved by the actuator 6, which may be directly proportional to the angle through which the shaft 8 of the actuator 6 has turned, for example) and will depend also on the details of the patterns formed in/on the first 2A, second 4 and/or third 2B panels.

Often, a user may wish to open the panel unit 1 (i.e. move the second panel 4 to a position which lets the user see through the unit 1) at a varying rate. For example, the user may wish to open the unit 1 gradually at first and more quickly thereafter, or the reverse. Other more complex opening sequences may be envisaged and the extent to which they commonly occur will depend on the particular use of the panel unit 1.

Where the desired opening sequence is complex in this way, it is likely that one or more phases will be awkward to realise for a user. For example, phases of rapid opening in the sequence may require uncomfortably rapid rotation of the handle 7 (i.e. the sensitivity of the actuator 6 is too low) while phases of very slow opening may be difficult to achieve if the actuator 6 is too sensitive. It is difficult to design the actuator 6 to be convenient for all different speeds.

Figure 3:
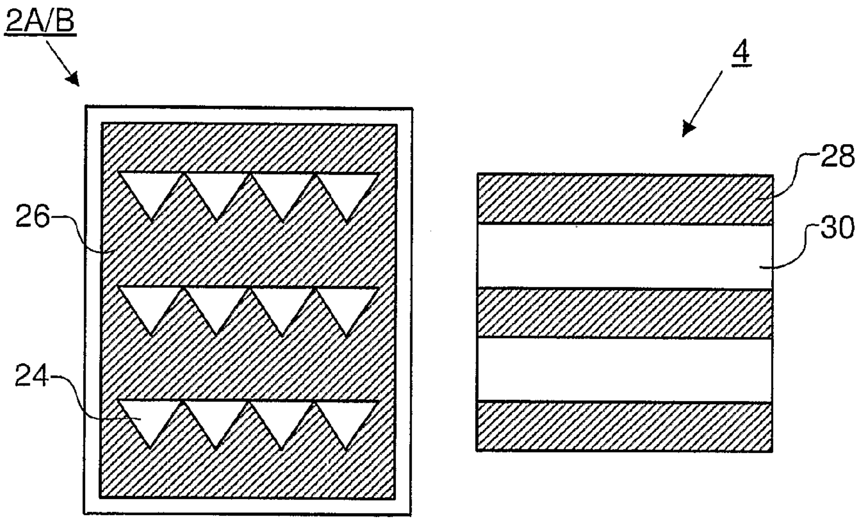
FIG. 3 depicts a second panel with second panel light hindering regions and second panel light transparent regions.

FIG. 3 shows an example arrangement in which the patterns on the first 2A (and/or third 2B) and second 4 panels are arranged so as to facilitate particular opening sequences. The left-hand figure shows a first 2A (and/or third 2B) panel with a pattern consisting of a light hindering region 26 (in the example, the region 26 is continuous but a plurality of disconnected light hindering regions may also be used) and transparent regions 24. The right-hand figure shows a second panel 4 with light hindering regions 28 and transparent regions 30.

FIGS. 4A-4D show different stages in an opening sequence of the panel unit 1 for the first 2A (and/or third 2B) and second 4 panel patterns shown in FIG. 3. In each figure, the left-hand view shows the panel unit 1 from the side with the first 2A (and/or third 2B) panel on the left and the second panel 4 on the right. The second panel 4 is smaller than the first 2A (and/or third 2B) panel so as to allow relative movement between the two.

Figure 4A:
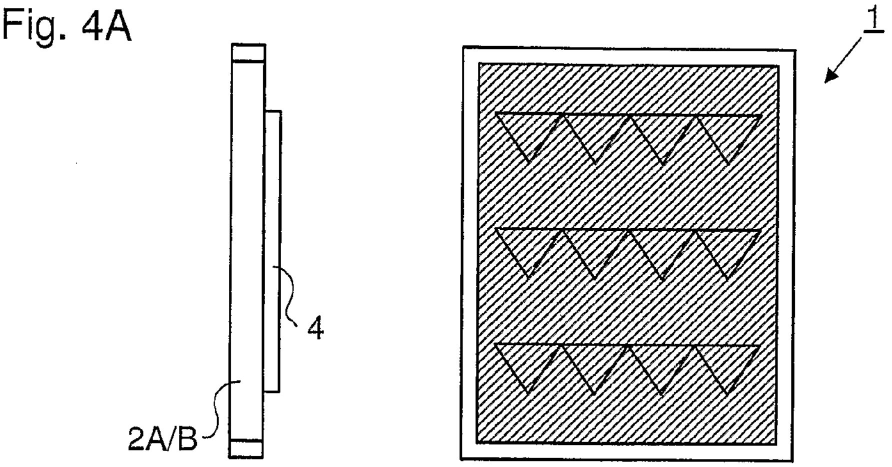
FIG. 4A-4D depict side and front views of a domestic viewing panel unit at different degrees of actuation in an opening sequence.

In FIG. 4A, the panel unit 1 is in a completely "closed" state, there being no overlap between transparent regions 24 and 30 of the first 2A (and/or third 2B) panel and second panel 4.

Figure 4B:
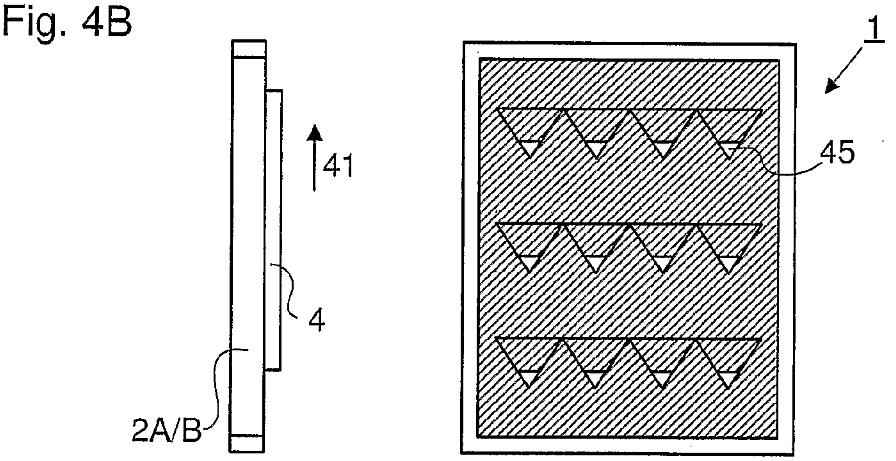

In FIG. 4B, the panel unit 1 has been actuated into a partially open state by moving the second panel 4 upwards, as indicated by arrow 41. Transparent openings 45, corresponding to regions of overlap between transparent regions 24 and 30, allow a small proportion of the light incident on the panel unit 1 to pass through unhindered.

Figure 4C:
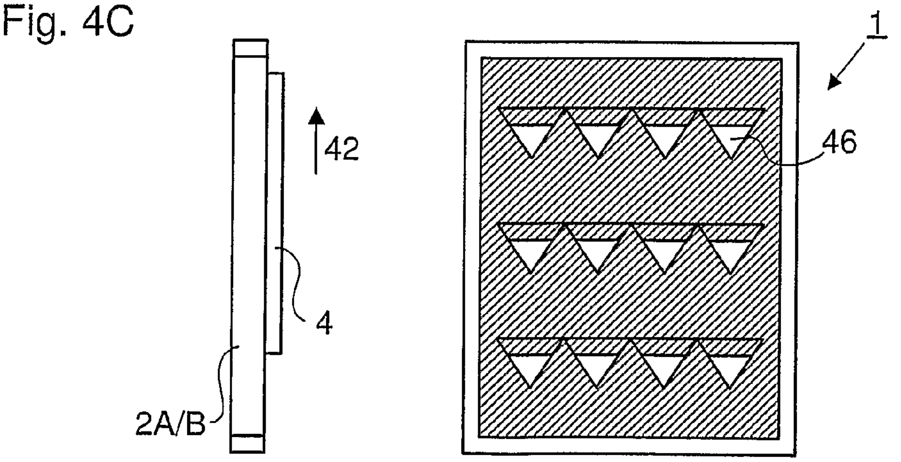

In FIG. 4C, the panel unit 1 has been actuated further by moving second panel 4 further upwards (to a position twice as far away from the closed position as that in FIG. 4B), as shown by arrow 42. However, because of the shape of the transparent regions 24, the amount of light allowed through the panel unit 1 unhindered is now much greater than that in FIG. 4B (see overlap regions 46). In particular, it can be seen that the response is not linear in the sense that the amount of light let through unhindered is not directly proportional to the distance moved by the second panel 4.

Figure 4D:
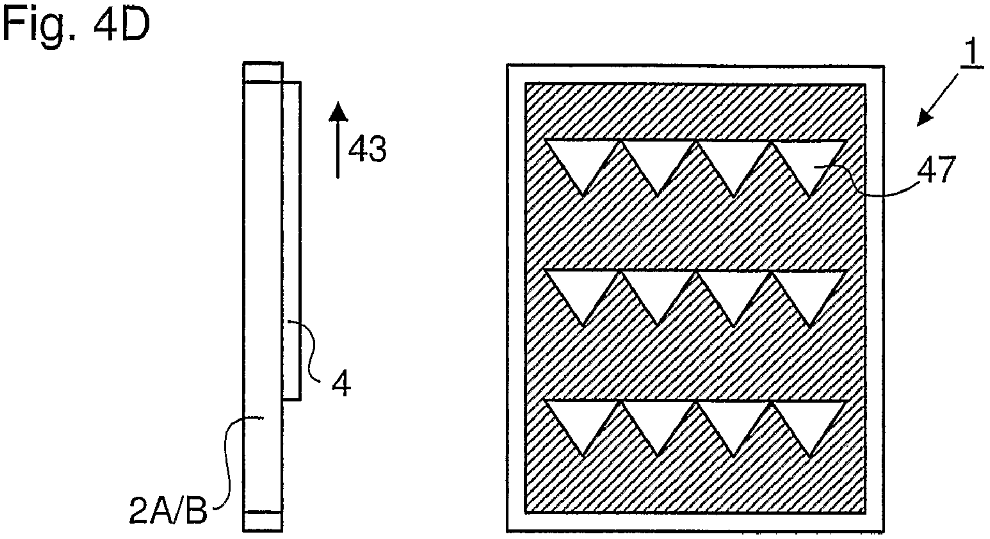

FIG. 4D shows the panel unit in a maximally open state, which has been achieved by moving the second panel 4 three times as far as it was moved in FIG. 4B (arrow 43). Again, it can be seen that the response is not linear: the amount of light let through unhindered in the arrangement of FIG. 4D is more than three times that allowed through in FIG. 4B and also more than 50% more than that let through in FIG. 4C (see overlap regions 47).

In fact, in the present case, the amount of light that passes unhindered through the panel unit 1 varies as the square of the position of the second panel 4 for all positions of the second panel 4 that are above that shown in FIG. 4A.

More complex variations can be established by adjusting the patterns on the second panel 4 and/or first 2A (and/or third 2B) panel in an appropriate manner.

The arrangement shown in FIGS. 3 and 4A-D would facilitate actuation of the panel unit 1 in the case where the user wishes to obtain an opening sequence that lets light in at an increasing rate (slowly at first and faster later on). This may be achieved without having to vary the rate of turning of the handle 7 of the actuator 6 to as great an extent as would be necessary if the panel unit 1 had a linear response.

The converse opening sequence, in which light is to be let in at a decreasing rate (fast at first and slower later on), can be achieved by actuating the panel unit 1, starting from the closed position illustrated in FIG. 4A, in the opposite direction (i.e. so that the second panel 4 moves downwards rather than upwards). This may be achieved, for example, by turning handle 7 of the actuator 6 in the opposite direction. This arrangement is thus useful where two different opening sequences are regularly used. More opening sequences can be achieved if the second panel 4 is arranged to be movable in more than two directions (e.g. left and right as well as up and down).

Figure 5:
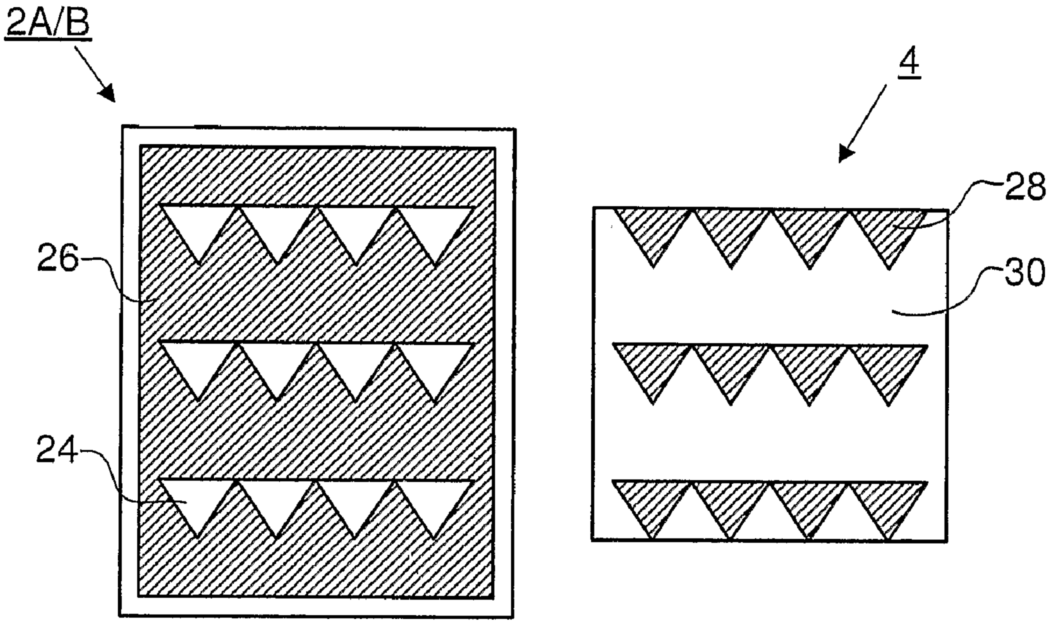
FIG. 5 depicts first and second panels with complementary patterns.

FIG. 5 shows an alternative arrangement to that of FIG. 3. Here the same first 2A (and/or third 2B) panel is used but the second panel 4 is this time patterned so as to be complementary to the pattern on the first 2A (and/or third 2B) panel. In particular, when the first 2A (and/or third 2B) panel and the second panel 4 are aligned so that the panel unit 1 is in the closed position, the light hindering regions 28 of the second panel 4 line up exactly with the light transparent regions 24 of the first 2A (and/or third 2B) panel, without there being any overlap between the light hindering regions 28 of the second panel 4 and the light hindering region 26 of the first 2A (and/or third 2B) panel. This improves the homogeneity of transmission in the closed position and helps conceal the fact that the panel unit 1 is actuatable, which may be desirable in certain circumstances. For example, where the panel unit 1 is to be used as a type of peephole in a front door, it may be advantageous to make the panel unit 1 as discrete as possible so that a visitor is not aware that he is susceptible to being viewed.

Figure 6:
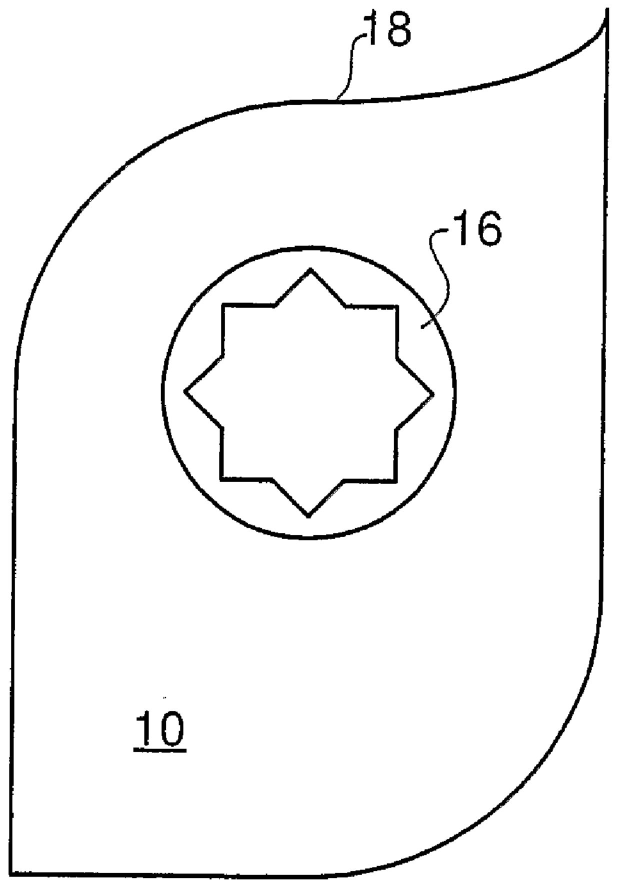
FIG. 6 is a schematic view of a cam shaped to provide a non-linear response.

FIG. 6 shows an example of a cam 10 arranged to provide a non-linear relationship between the angular displacement of the shaft 8, which engages with the cam via socket 16, and the relative movement between the first and second panels 2A and 4 respectively. In the example shown, the non-linear relationship is obtained by means of the curved upper surface 18 of the cam 10, which engages with the lower extremity of the second panel 4 in order to move it up and down.

The patterns of light hindering and light transparent regions on the first, second or third panels may be formed using a system of stencils and sandblasting. In such a method, a stencil is applied to the panel prior to sandblasting and acts to protect certain regions from the sandblasting process. Regions which are left exposed by the stencil will form the light hindering regions and regions masked by the stencil will remain transparent. Once the sandblasting process has been completed, the stencil can be removed to reveal the desired pattern. Other methods of creating light hindering regions, for example using chemical etching agents, may alternatively or additionally be employed in conjunction with masking stencils in an analogous manner.

In general, the first 2A, second 4 and/or third 2B panels may be patterned on either side (i.e. at or near the surface of the panel using, for example, sandblasting, etching, etc.) or may be patterned throughout the bulk of the panel (using inclusions such as bubbles, for example). Where the patterning is near the surface, the patterned sides on the first 2A and/or third 2B panel may be located so as to face the interior of the assembled viewing panel unit 1 (so the pattern is protected from the environment, for example). The patterned faces of the first 2A and second 4 or second 4 and third 2B may be arranged to face each other in the assembled viewing panel unit 1.

The invention claimed is:

1. A domestic viewing panel unit for a door, comprising:

a first panel comprising one or more first panel light transparent regions that are substantially transparent to visible light and one or more first panel light hindering regions which substantially hinder transmission of visible light;

a second panel comprising one or more second panel light transparent regions that are substantially transparent to visible light and one or more second panel light hindering regions which substantially hinder transmission of visible light;

an actuator for moving said second panel relative to said first panel in a plane parallel to the plane of said first panel; wherein said first and second panels are arranged such that the amount of visible light transmitted unhindered through the domestic viewing panel unit is a non-linear function of the position of the second panel relative to the position of the first panel, for at least a portion of an allowed range of actuation.

2. A domestic viewing panel unit according to claim 1, wherein said first and second panels are arranged such that the amount of visible light transmitted unhindered through the domestic viewing panel unit is proportional to the degree of overlap of said first and second panel light transparent regions.

3. A domestic viewing panel unit according to claim 1, wherein said first and second panels are arranged such that the first and second derivatives of the amount of visible light transmitted unhindered with respect to a displacement between said first and second panels in a given direction are positive, for at least a portion of an allowed range of actuation.

4. A domestic viewing panel unit according to claim 1, wherein said first and second panels are arranged such that the first derivative of the amount of visible light transmitted unhindered with respect to a displacement between said first and second panels in a given direction is positive and a second derivative of the amount of visible light transmitted unhindered with respect to a displacement between said first and second panels in the same direction is negative, for at least a portion of an allowed range of actuation.

5. A domestic viewing panel unit according to claim 1, wherein said first and second panels are arranged such that, from a starting position, actuation of said actuator in a first sense causes movement of said second panel relative to said first panel in a first direction such that the amount of visible light transmitted unhindered has a positive first derivative and a positive second derivative with respect to displacement in said first direction; and from the same starting position, actuation of said actuator in a second sense causes movement of said second panel relative to said first panel in a second direction such that the amount of visible light transmitted unhindered has a positive first derivative and a negative second derivative with respect to displacement in said second direction.

6. A domestic viewing panel unit according to claim 5, wherein said first direction is opposite to said second direction.

7. A domestic viewing panel unit according to claim 5, wherein said first direction is at right angles to said second direction.

8. A domestic viewing panel unit according to claim 1, wherein said first panel light transparent regions are complementary with said second panel light hindering regions.

9. A domestic viewing panel unit according to claim 1, wherein the way in which visible light is hindered varies as a function of position within in at least one of said first panel light hindering regions, at least one of said second panel light hindering regions, or both.

10. A domestic viewing panel unit according to claim 1, wherein said actuator comprises a rotatably mounted shaft; and a cam attached to a distal end of the shaft and arranged to interact with the second panel so as to transform rotational movement of the shaft into linear movement of the second panel; wherein said cam is arranged such that there is a non-linear relationship between the angular displacement of the shaft and the relative movement between the first and second panels.

11. A domestic viewing panel unit according to claim 1, comprising a third panel and arranged such that the second panel is located between the first and third panels.

12. A domestic viewing panel according to claim 11, further comprising sealing means which cooperate with the first and third panels to form a sealed unit around the second panel.

13. A domestic viewing panel unit according to claim 12, wherein said actuator comprises a rotatably mounted shaft; and a cam attached to a distal end of the shaft and arranged to interact with the second panel so as to transform rotational movement of the shaft into linear movement of the second panel; wherein said cam is located within said sealed unit and said shaft passes through one of said first and third panels and cooperates with a handle to facilitate manual rotation of said shaft by a user.

14. An entrance door comprising a domestic viewing panel unit according to claim 1.

* * * * *